United States Patent [19]

Ku et al.

[11] Patent Number: 4,791,590

[45] Date of Patent: Dec. 13, 1988

[54] HIGH PERFORMANCE SIGNAL PROCESSOR

[75] Inventors: Walter H. Ku, La Jolla, Calif.; Richard W. Linderman, Dayton, Ohio; Paul M. Chau, Ithaca, N.Y.; Peter P. Reusens, Destel Bergin, Belgium

[73] Assignee: Cornell Research Foundation, Inc., Ithaca, N.Y.

[21] Appl. No.: 799,692

[22] Filed: Nov. 19, 1985

[51] Int. Cl.$^4$ .......................... G06F 7/34; G06F 7/38
[52] U.S. Cl. ...................................... 364/726; 364/736
[58] Field of Search ................ 364/726, 724, 728, 736, 364/754, 768, 749

[56] References Cited

U.S. PATENT DOCUMENTS

| | | | |
|---|---|---|---|
| 3,638,004 | 1/1972 | Sloane et al. | 364/726 |
| 4,093,994 | 6/1978 | Nussbaumer | 364/726 |
| 4,398,274 | 8/1983 | Chotiros | 364/726 |
| 4,407,018 | 9/1983 | Kanemasa | 364/726 |
| 4,468,748 | 8/1984 | Blau et al. | 364/748 |
| 4,489,393 | 12/1984 | Kawahara et al. | 364/728 |
| 4,547,862 | 10/1985 | McIver et al. | 364/726 |
| 4,563,750 | 1/1986 | Clarke | 364/726 |
| 4,641,260 | 2/1987 | Fukukita et al. | 364/726 |

OTHER PUBLICATIONS

Roste, T. et al., "A Radix-4 FFT Processor for Application in a 60-Channel Transmultiplexer Using TTL Technology", *IEEE Transactions on Acoustics, Speech, and Signal Processing*, vol. ASSP-27, No. 6, pp. 745-751, Dec. 1979.

Bergland, G., "Fast Fourier Transform Hardware Implementations—An Overview", *IEEE Transactions on Audio and Electroacoustics*, vol. AU-17, No. 2, pp. 104-108, Jun. 1969.

Troutman, B. et al., "Session II: Digital Signal Processors", *IEEE International Solid-State Circuits Conference*, Feb. 1982.

Reusens, P. P., "High-Speed Signal Processing VLSI Chip Architectures", *Fourth Annual Research Review*, Oct., 1982.

Linderman, R. W., "Design of a High Performance VLSI Signal Processing Chip", *Fifth Annual Research Review*, Oct., 1983.

Chau, P. M., "VLSI CMOS Signal Processing Chip: Design and Fabrication", *Sixth Annual Research Review*, Oct., 1984.

Chau, P. M., "A High Performance Signal Processing Chip Architecture With Design for VLSI Testability", *Seventh Annual Research Review*, Oct., 1985.

Reusens, P. P. et al., "CUSP: A Custom VLSI Processor for Digital Signal Processing Based on the Fast Fourier Transform", *IEEE International Conference on Computer Design*, pp. 1-4, Oct. 1983.

Linderman, R. W. et al., "Digital Signal Processing Capabilities of CUSP, A High Performance Bit-Serial VLSI Processor", *Proceedings of IEEE International Conference on Acoustics, Speech, and Signal Processing*, pp. 16.1.1-16.1.4, Apr. 1984.

Ku, W. H. et al., "Advanced System Architectures for VHSIC Performance with Fault Tolerance", *Government Microcircuits Application Conference*, Nov. 1984.

Bursky, D., "Digital-Signal-Processing Chips Move Off the Designer's Wish List and into Everyday Use", *Electronic Design*, pp. 101-114, May 17, 1984.

Beedie, M., "Digital Signal Processing Makes the Headlines at European Conference", *Electronic Design*, 85-87, Sep. 6, 1984.

Linderman, R. W., "CUSP: A 2-$\mu$m CMOS Digital Signal Processor", *IEEE Journal of Solid-State Circuits*, vol. SC-20, No. 3, Jun. 1985.

*Primary Examiner*—Gary V. Harkcom
*Assistant Examiner*—Long Thanh Nguyen
*Attorney, Agent, or Firm*—Jones, Tullar & Cooper

[57] ABSTRACT

A monolithic high performance processor for computing digital signal processing algorithms based on the Fast Fourier Transform. The monolithic processor employs an array of bit-serial multipliers which cooperate with bit-serial adder/substractors to produce fast results with great precision, with reduced printed-circuit board space, and with low power requirements. The processor uses local asynchronous control and simple interfacing with the host computer. The processor, which is applicable to a broad spectrum of digital signal processing, including digital audio, radar/sonar, seismic and speech processing, operates in a variety of modes which allow the device to perform Fast Fourier Transforms, Inverse Fast Fourier Transforms, windowing, multiplication, Finite Impulse Response filtering, convolution and correlation.

24 Claims, 12 Drawing Sheets

MASTER/SLAVE FLIP FLOPS

$ODD = A \oplus B$
$EVEN = \overline{ODD} = \overline{A \oplus B}$

TRANSMISSION GATE FULL ADDER

$t_1$: NEW VALUES PRESENTED TO LOGIC OF PLA
$t_2$: NODES MUST BE CHARGED
$t_3$: RESULTS MUST BE STABLE

HIGH PERFORMANCE SIGNAL PROCESSOR

BACKGROUND OF THE INVENTION

The present invention relates, in general, to a high performance signal processor, and more particularly to a signal processor for efficiently computing digital signal processing algorithms based on the Fast Fourier Transform.

The Fast Fourier Transform (FFT) is one of the most frequently used algorithms in digital signal processing. It finds applications in digital audio systems, radar and sonar signal processing, seismic systems, and speech processing. These applications require numerical precision ranging from 8 bits to 20 bits and, in some cases require a floating point number representation. The sampling rates for such processing vary from Hertz to mega-Hertz. These broad and varied requirements have been difficult to meet, and accordingly, prior devices for carrying out the FFT have been large arrays, using multiple integrated circuit chips on a printed circuit board. Such large arrays have operated under the control of a host computer, burdening the computer and limiting the speed at which such devices could operate. Since in many applications, such as radar signal processing, speed is the primary objective of a processor, prior processor systems and devices have been unduly limiting.

In addition to the limits on device speeds, many prior devices have encountered difficulties in producing a high degree of numerical accuracy, caused in part by the need to round off the intermediate processing results during the processing operations. Such rounding, or truncation, of intermediate results occurs after the parallel multipliers and/or adders used in prior systems, where the least significant bits are eliminated, thereby limiting the accuracy of the results. A further problem with such prior devices is that they require a large amount of space (multiple chip sets) to accommodate the arrays, which results in relatively high power consumption. Finally, prior implementations require complicated and sophisticated programming to enable those systems to work, whereas the present invention has a simple three-line handshake protocol with a host computer.

SUMMARY OF THE INVENTION

The present invention is directed to an autonomous, monolithic signal processor chip incorporating network components and having a system architecture which enables it to perform signal processing an order of magnitude faster than was available with prior systems, with greater numerical precision, and with greater reliability than was available with prior systems.

The present signal processor, in one embodiment, is a 2μCMOS process designed in VLSI (Very Large Scale Integration) technology to efficiently compute digital signal processing algorithms based upon the Cooley-Tukey Decimation-In-Time Radix-4 Fast Fourier Transform. One chip can be used as a stand-alone peripheral in a microprocessor system, or a number of chips can be combined into arrays in order to process signals with sampling rates of several MHz. Using this VLSI monolithic chip invention, there are substantial reductions in power needs and reductions in real estate needs (ie, circuit board space) over comparable previous implementations of the FFT algorithm.

Although most monolithic processing systems designed to perform the Fast Fourier Transform have been designed around the use of a single 16 bit×16 parallel multiplier (see "A 2μ CMOS/LSI 32-point Fast Fourier Transform Processor" B. L. Troutmans et al, Proc. 1982 IEEE ISCC, pgs. 26-27 and 282-283; and Digital Signal/Array Processing Products, New Product Information, Advanced Micro Devices, 901 Thompson Place, Sunnyvale, Calif. 94086; and Electronic Design News, Nov. 10, 1983, page 256), such devices are complex and require numerous chips, which have the disadvantages noted above. The present system takes advantage of a bit-serial approach to overcome many of the prior device problems. Thus, the present device uses sixteen 20 bit+20 bit bit-serial multipliers and 24 serial adders to compute more accurate results much faster than comparable bit-parallel processors.

The present device operates with a very simple asynchronous control interface with a host computer, so that the user can select a system architecture which best suits a wide range of applications of the device. Thus, the present signal processor can be a simple peripheral to a microprocessor system which performs filtering on audio inputs or other complex signals, or can be a part of a complex fault-tolerant array of chips computing FFTs for radar or sonar applications. This is done while maintaining a high level of numerical accuracy (signal-to-noise ratio). In any iterative computation, there is always a loss of accuracy at each iterative step when finite register lengths are used. The present invention minimizes this loss of accuracy when contrasted with prior comparable implementations. For example, in a representative 1024 point FFT followed by an Inverse FFT (IFFT), this invention would yield in the range of 88 dB of signal-to-noise ratio which is significantly better than was available in prior FFT devices. Furthermore, the present device maximizes the speed of operation, providing in the range of 15.4 million multiplications per second in a very small, low power device.

The FFT algorithm is an efficient means of computing the Discrete Fourier Transform (DFT) on a block of data. The block of data represents a finite duration sequence (or signal) in time. Computing the DFT uniquely maps this sequence into a frequency domain representation. The N words in the DFT results are the values of the Z-transform at N equally spaced points around the unit circle in the Z-plane. The DFT can be expressed as follows:

$$X(k) = \sum_{i=0}^{N-1} x(i) W_N^{ik} \quad (1)$$

where the $W_N$ terms complex roots of the unity, and $$W_N = e^{\frac{-j2\pi}{N}}$$

The x(i) are the N words of the time domain signal and the X(k) are the N words of the frequency domain transform. The DFT can also be written as a matrix-vector multiplication which requires $O(N^2)$ operations, where "O()" is the notation for "Order of Magnitude". However, using the FFT algorithm, the computational complexity can be reduced to $O(N \log N)$.

The FFT algorithm derives its regularity and flexibility from repeatedly applying the same primitive arithmetic operation, called a "butterfly," to the block of data. The two most common butterfly operations are the radix-2 and the radix-4 butterflies, which can be described in matrix equations.

The decimation-in-time radix-2 butterfly operates on two data inputs as follows:

$$\begin{vmatrix} X(0) \\ X(1) \end{vmatrix} = \begin{vmatrix} 1 & 1 \\ 1 & -1 \end{vmatrix} \begin{vmatrix} 1 & 0 \\ 0 & W^k \end{vmatrix} \begin{vmatrix} x(0) \\ x(1) \end{vmatrix} \quad (2)$$

where $$W = e^{\frac{-j2\pi}{N}}.$$

To form an N point FFT using a radix-2 butterfly processor, $\log_2 N$ sequential scans are made through the data memory. Each scan requires N/2 butterfly operations.

Using a radix-4 butterfly replaces four radix-2 butterflies. The radix-4 operations can be expressed as:

$$\begin{vmatrix} X(0) \\ X(1) \\ X(2) \\ X(3) \end{vmatrix} = \begin{vmatrix} 1 & 1 & 1 & 1 \\ 1 & -1 & 1 & -1 \\ 1 & -j & -1 & j \\ 1 & j & -1 & -j \end{vmatrix} \begin{vmatrix} 1 & 0 & 0 & 0 \\ 0 & W^k & 0 & 0 \\ 0 & 0 & W^{2k} & 0 \\ 0 & 0 & 0 & W^{3k} \end{vmatrix} \begin{vmatrix} x(0) \\ x(1) \\ x(2) \\ x(3) \end{vmatrix} \quad (3)$$

It should be noted that outputs X(1) and X(2) have been interchanged in (3) from the "normal" formulation of the radix-4 butterfly. This allows the FFT results to be arranged in "bit-reversed" order instead of radix-4 "digit-reversed" order.

The architecture of the present device is based on the efficient execution of the radix-4 butterfly operation using bit-serial arithmetic hardware. The radix-4 butterfly is preferred because it reduces the necessary communication between the device and external memory by 50% compared with radix-2, it allows four times the arithmetic parallelism to be carried out in the processor, and it allows improvement in the numerical precision by reducing errors caused by the rounding and scaling of data. In addition, the invention implements the radix-4 butterfly in a unique architecture which does not restrict the possible FFT sizes to only powers of 4. Rather, the present invention can calculate any FFTs with sizes which are any power of 2 between 4 and 16,384 (16K). This is a novel and unique trait of the architecture, since it allows the outputs of the radix-4 butterfly to be produced in a "bit-reversed" ordered FFT result instead of radix-4 "digit reversed" ordered result. The "digit-reversed" ordered FFT results would normally be the result of a system based on the standard radix-4 butterfly operation.

The complement of the DFT algorithm, known as the Inverse DFT (IDFT), can be used to transform a sequence in the frequency domain back to the time domain. The formula for the IDFT is:

$$x(n) = \frac{1}{N} \sum_{i=0}^{N-1} X(i) W_N^{-in} \quad (4)$$

where X(i) represents the N words of the frequency domain representation to be transformed back into the N words of the time domain singal x(n). This has the same form as the DFT equation (1), except that the W matrix entries have been complex conjugated, and the result divided by N. This allows an efficient inverse FFT algorithm to implement the IDFT using hardware which is nearly identical to the FFT hardware, giving the chip of the present invention a second, easily attainable mode of operation.

The processor chip of the present invention interfaces directly with a host computer and with suitable RAM and ROM for the storage of data and coefficients external to the chip. The processor chip contains all the control logic required to autonomously execute FFTs or other computations without intervention by the host computer. Therefore, only "OPERATE", "DONE", and "LOAD ASSIGNMENT" interface lines between the host and the processor chip are required. After the host computer has loaded input data into the memory, it activates the processor via the "OPERATE" line, and the processor operates asynchronously under the control of a local external clock which can have the processor operate at 50 MHz, for example. Upon completion of its assignment, the device activates the "DONE" line to the host computer, which responds by deactivating the "OPERATE" line, and resetting the processor chip. This avoids burdening the host computer with complex control functions, as was necessary in prior FFT systems.

The processor chip includes mode control logic which enables it to operate on blocks of data containing up to 16K complex points in a programmed sequence of up to five modes, including FFT, Inverse FFT, windowing, multiplication, and scaling. These modes allow the operator to assign a variety of signal processing tasks, including FFTs, IFFTs, Finite Impulse Response (FIR) filtering, convolution and correlation. The device can be quickly changed from one task to another, with differing data sizes, if desired.

To accomplish the foregoing, the processor chip of the present invention consist of arithmetic hardware, including an array of 16 bit-serial multipliers and a bit-serial adder/subtractor matrix. The chip further includes input latches for receiving data from an external memory through input-output ports, and control logic, comprising of an address generator which provides the addresses necessary to extract data and coefficients from memory and to provide the addresses for storing the results computation. In addition, there is an internal control sequencer PLA (Programmable Logic Array) which provides all the necessary signals to operate the multipliers and the adder subtractor matrix. The control sequencer also generates the signals for controlling the data scaling, rounding and parity generation and the shifting of the arithmetic results into temporary shift register arrays before the results of the arithmetic processing are returned to memory.

The processor chip of the invention can further be used as an element in an array of processor chips operated by a host computer for providing significantly increased processing speed. Such an array also provides redundancy for the chips, to permit selected chips to perform a watchdog function to detect errors in the data or address outputs of an active chip, thereby providing a fault tolerant system.

More particularly, the device of the present invention consists of a monolithic, autonomous signal processor chip having a multiplier array of 4 bit-serial complex multipliers, each includng 20 bit slices, for carrying out four simultaneous bit-serial complex multiplications of four complex data words and four complex coefficient words, each complex word being up to 20 bits in length. A control logic circuit including an address generator on the processor chip selects the data and coefficient words to be multiplied from suitable memory devices which may be RAM or ROM devices external of the chip. A control sequence on the chip drives the multiplier array to perform the complex multiplication. Novel adder circuitry is used in the multiplier array.

An adder/subtractor matrix including a plurality of sum and difference networks is connected to the output of the multiplier array to receive and combine the outputs from the array to produce high-precision real and imaginary serial result signals which are temporarily stored in corresponding real and imaginary result shift registers. Prior to such storage, the result signals are bit-serially rounded by rounding circuitry connected to the adder/subtractor matrix.

Input/output circuits on the processor chip are connected to the multiplier array to supply data and coefficient words to be multiplied, and are connected to the result shift registers for supplying result signals temporarily stored in the shift register to external memory under the control of the control logic circuit on the processor chip.

Scaler circuits may be provided for the adder/subtractor matrix for scaling the result signals, and suitable parity check circuitry may be provided.

The multiplier array of four bit-serial complex multipliers includes 20 bit slices, each of which consists of one corresponding bit slice core segment from each multiplier. Each of the four core segments in a slice incorporates a data latch and a coefficient latch for receiving corresponding bits of the input data and coefficient words. Each core segment also includes a multiplier stage having a full adder connected to a sum-save static register and a carry-save static register, the data latch and the coefficient latch being connected to the multiplier stage through a partial bit generator. The data latches each include a master/slave flip-flop circuit.

All of the elements of the processor are positioned on a single chip, and are closely spaced to permit extremely short interconnections to provide a low-noise, high-speed processor chip of extremely small dimensions. The chip is connected through its input/output ports to external data, address, and control buses to external read only memory (ROM) and external random access memory (RAM), which store coefficients and data words, respectively. The chip is also connected through the buses to a host computer, which supplies the data words for use in the processor chip, and which receives the results of the processing. The processor chip is driven by a local clock which is independent of the host computer, so that the processor operates asynchronously. This allows the processor to function without burdening the computer.

BRIEF DESCRIPTION OF DRAWINGS

The foregoing and additional objects, features and advantages of the present invention will be more clearly understood from the following detailed description of a preferred embodiment thereof, taken in conjunction with the accompanying drawings, in which.

DESCRIPTION OF PREFERRED EMBODIMENT

Figure 1:
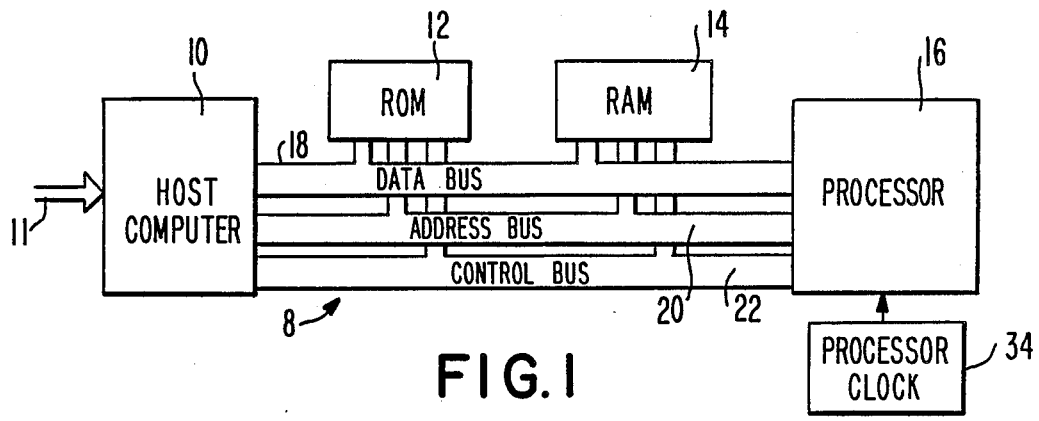
FIG. 1 is a diagrammatic illustration of a system utilizing a single processor chip in accordance with the present invention, the chip being used as a peripheral processor for a host computer.

Turning now to a more detailed consideration of the present invention, there is shown in diagrammatic form in FIG. 1 a system 8 utilizing the device of the present invention for signal analysis. A host computer 10 receives on line 11 samples of a signal to be analyzed, and supplies to a Random Access Memory (RAM) 14, data obtained from the signal samples in the form of complex words of up to 20 bits length. The coefficients ($W_N$) required to compute an FFT are permanently stored in a Read-Only Memory (ROM) 12; these coefficients are multiplied by the signal data in performing the radix-4 FFT butterfly arithmetic. The data (in RAM 14) and the coefficients (in ROM 12) may require from 4 to 16,384 memory points each, depending upon the user's option, and accordingly each memory can be as large as is a 16K (16,384) word memory. The host computer 10 is connected to the memories 12 and 14 and to the processor chip of the present invention, illustrated at 16, by means of a data bus 18, over which data is supplied to the memories by the host computer 10, over which data and coefficients are transferred to the processor 16 for processing, and over which results are returned to RAM memory 14 from processor chip 16. An address bus 20 is connected from the host computer 10 to memories 12 and 14 and to the processor 16 to place data in selected locations of the RAM memory 14, in addition to allowing the host computer 10 to send encoded programming information to the processor chip 16. It also allows the processor chip 16 to select data sequentially from the memories 12 and 14 for processing by means of addresses generated in the processor chip 16, and to return the processed results to RAM memory 14. A control bus 22 is connected between the host computer 10, the processing chip 16, and the memories 12 and 14 to permit the host computer 10 to enable and disable the chip 16 and the memories 12 and 14.

Figure 3:
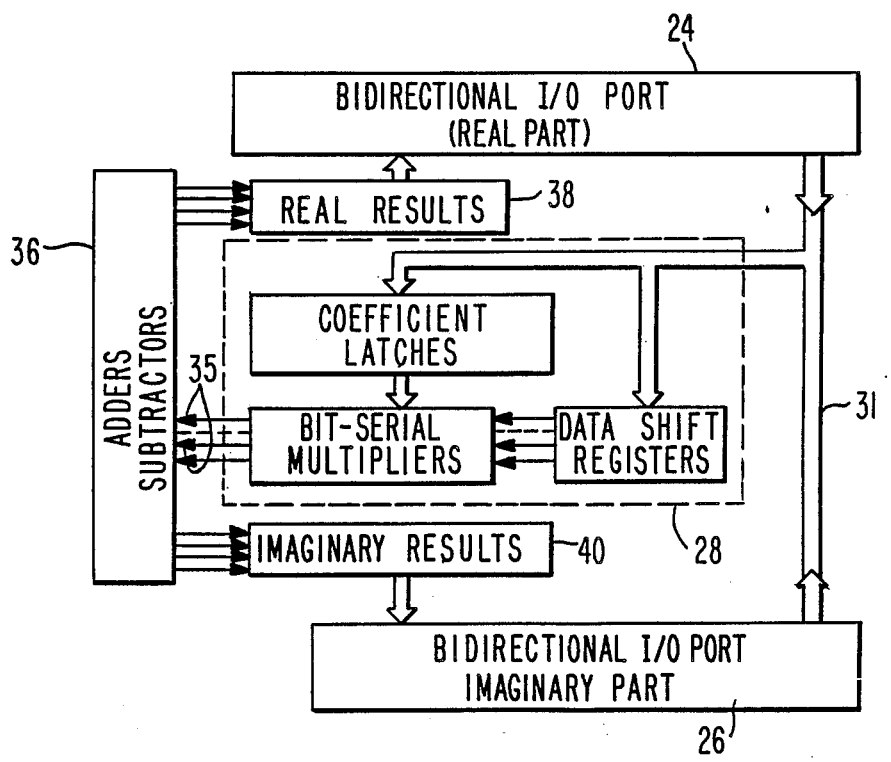
FIG. 3 is a diagrammatic illustration of the data flow in the processor chip of the present invention.
Figure 2:
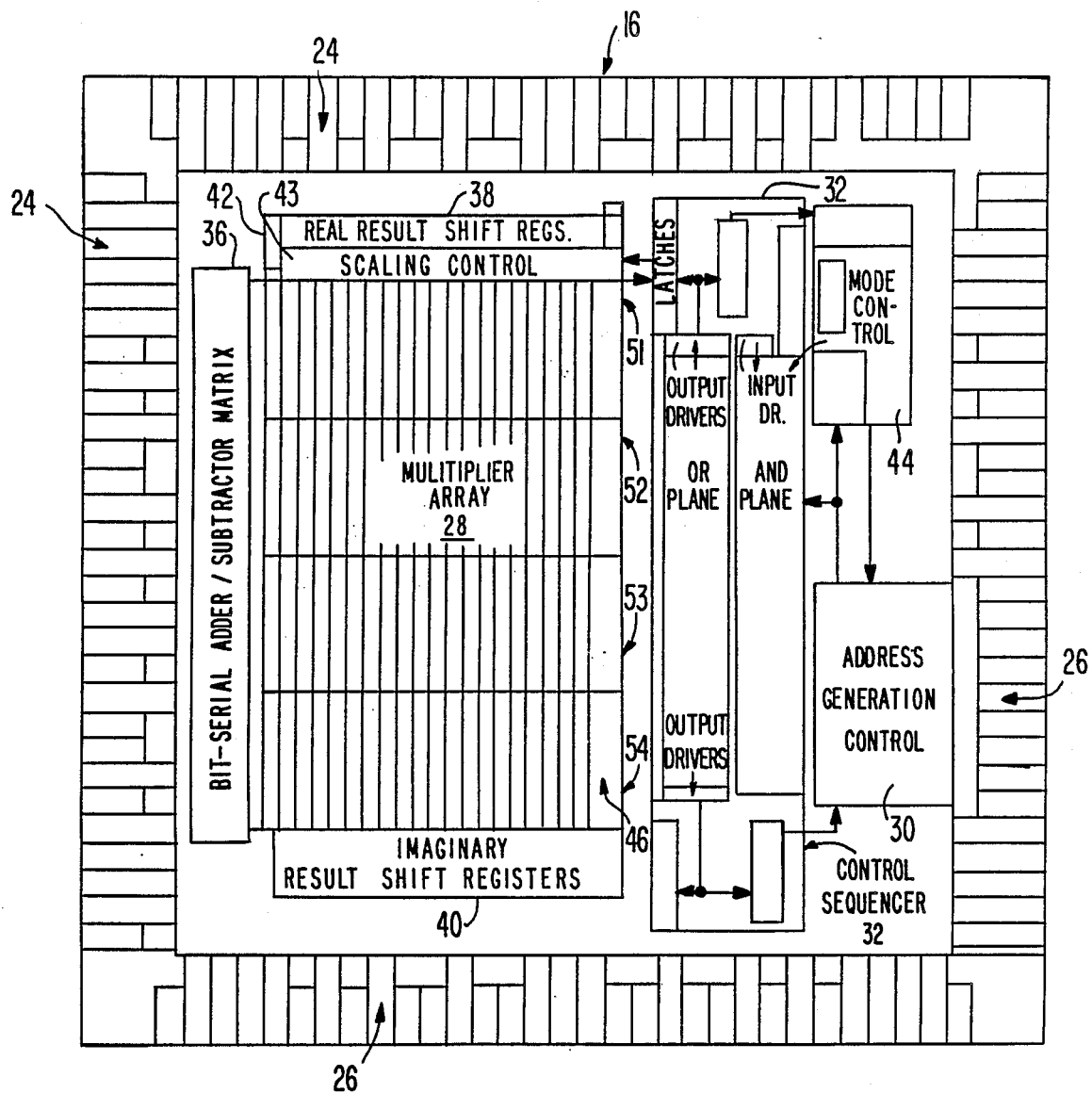
FIG. 2 is a diagrammatic illustration of the floorplan of the architecture of the processor chip of the present invention.

Processor chip 16 is illustrated in diagrammatic form in FIG. 2 and its data flow is illustrated in FIG. 3. The processor chip 16 is a monolithic VLSI chip which may be constructed using a conventional 2 $\mu$m bulk CMOS process with two layers of metalization, providing on the order of 62,000 transistor devices on a chip 7.5 mm×7.5 mm in size. The processor uses a 20 bit block floating point internal data represention and can accept FFT inputs up to that degree of precision (20 bits) using a fixed point representation. The processor chip shown in FIG. 2 includes conventional parallel input/output (I/O) data ports indicated generally at 24 and 26 by which the chip is connected via data bus 18 (FIG. 1) to the memories 12 and 14. Parallel data ports are used instead of bit-serial input/output ports to increase the I/O bandwidth and to simplify the interfacing requirements to the ROM 12 and RAM 14. This allows simultaneous access of the real and imaginary components of complex data words and coefficients. As shown in FIG. 3, which represents data flow in the processor chip 16, I/O port 24 provides access to real components, and I/O port 26 provides access to imaginary components. Twenty I/O terminals are provided for each of the ports 24 and 26, for a total of forty terminals. The combined use of dual I/O ports with the radix-4 algorithm cuts the input/output time by a factor of four, when compared to conventional radix-2 computations.

As shown in FIG. 2, processor 16 includes a multiplier array 28, having 16 bit-serial multipliers, which receives four complex data words and four complex coefficients selected from RAM 14 and ROM 12, respectively, by way of the I/O ports 24 and 26, where each complex word consist of 20 bits real and 20 bits imaginary. The data words and coefficients are selected by means of an address generation control logic circuit 30 on processor chip 16 and are supplied to multiplier array 28 by bus 31, functionally shown in FIG. 3, but not in FIG. 2, for simplicity of illustration. Four complex multiplications are executed in the multiplier array 28 using the 16 bit-serial multipliers, under the control of a control sequencer 32, driven by a local external processor clock 34 (FIG. 1). All four of the complex multiplications are carried out simultaneously in array 28, and the products are supplied by bus 35 (FIG. 3) for combination in a bit-serial adder/subtractor matrix 36. The result signals from matrix 36 are temporarily stored in result shift registers 38 and 40, which store the real and imaginary components of the results, respectively. A rounding/parity generation circuit 42 rounds the add/subtractor output before temporary storage in the shift registers 38 and 40. Parity generation is performed on results in 42, if the user programs the processor 16 to use parity.

A mode controller circuit 44 performs all the high level interfacing control between the processor chip 16 and the host computer 10. It receives external encoded programming information from host computer 10 via address bus 20. Internally it sends and receives control signals to the control sequencer 32, the address generation control 30, and other cells of the processor chip 16 as required.

The mode controller 44 controls the high level operation of the chip 16, and controls the interfacing with the host computer. It includes five major functional areas. First, it incorporates a small programmable logic array (PLA) to provide high level control signals. Second, it provides a bank of latches to store programming information received from the host computer. Third, it includes a scan counter register, which counts the number of iterations for the FFT implementation. Fourth, it includes a column of logic circuitry to select the mode of chip operation and to determine when the chip has finished its assigned tasks. Finally, it includes a control sequencer initializer, which is a column of logic circuitry to activate the control sequencer and to deactivate the control sequencer when the chip has accomplished all of its programmed tasks. In summary, the mode controller 44 represents a combination of conventional logic circuitry with selected functions required to control the internal operation of the chip and to interface with the external host computer. Such controllers are generally known.

The processor chip 16 receives data and coefficient inputs in a 16-bit fixed-point 2's-complement format, and since the signal processing is executed in place, no unrecoverable overflow from the arithmetic process is permitted. However, after the addition/subtraction of the matrix of complex numbers in the radix-4 computation, a growth of three bits (binary digits) per computation could occur in a few cases, expanding the result words to more than 20 bits. For this reason some scaling is required and is handled by the scaling control circuitry 43. In the present invention, overflow is prevented by scaling the intermediate results as a set of block floating-point numbers. Four extra guard bits are provided to allow for growth so that the intermediate results are stored with at most 20 bits of precision. On average, at least one result will be stored with 18 bits of precision. That is, each bit-serial multiplication of a 20-bit signed 2's-complement data word and coefficient produces a 39-bit double-precision bit-serial data result and the sign bit. The bit-serial results obtained in the multipliers 28 are summed in the bit-serial adder/subtractor matrix 36 to form the result of the butterfly computation. Before these results are shifted out of the processor chip 16, the oversized results are rounded bit-serially to 20 bits in the rounding/parity generation circuits 42, and are temporarily stored in registers 38 to 40. By waiting until the arithmetic processing is complete, before rounding, the present invention carries out only one rounding step per butterfly result, as opposed to more than twice as many rounding or truncating generations in prior systems.

The scaling of the intermediate results is accomplished in the result shift registers 38 and 40 under the control of the scaling control circuitry 43. This circuitry also holds the block floating point exponent of the scaling process.

Suitable parity check circuits 46 are provided on processor 16 for both data and coefficients. The circuits engage output error flags if the user has chosen to employ parity checking and generation.

The data representing the real and imaginary results in registers 38 and 40, respectively, is returned to RAM memory 14, overwriting the previous contents of the RAM at that address, since the present invention utilizes an in-place algorithm scheme. Once in the RAM, it is available for further processing as required. When all of the data has been processed in accordance with the radix-4 algorithm, the mode control circuit 44 signals the host computer, which then resets the processor chip 16.

Figure 4:
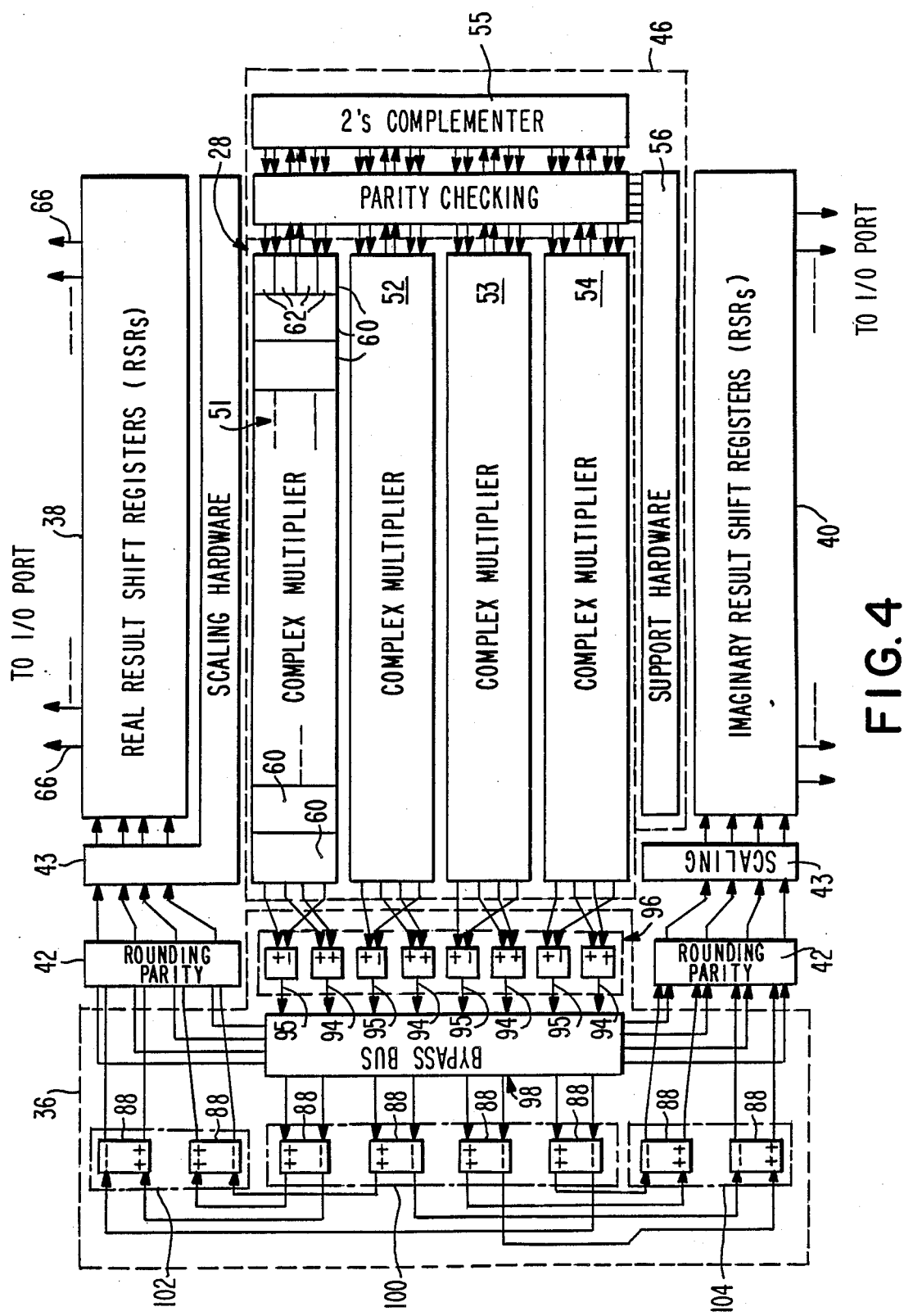
FIG. 4 is a diagrammatic illustration of the circuitry for the complex multiplier and adder/subtractor arrays and associated circuitry for the processor shown in FIG. 2.

The processor chip 16 performs four complex multiplications with sixteen real carry-save serial multipliers, shown as four complex multipliers 51, 52, 53, and 54 in multiplier array 28 (FIG. 4). The multipliers perform 20×20 bit multiplications if parity is not in use. Exercising the parity option reduces the multiplications to 19×19 bits.

The carry-save multiplier approach avoids carry rippling and allows systolic data flow between the multiplier bit-slices. This permits high speed operation of the multipliers. An additional advantage of this approach is that the full double precision outputs are available for input to the add/subtractor matrix 36. Some pipelined multipliers provide faster throughput but would produce only the 20 most significant bits of the results at the output.

Input data words and coefficient words supplied by way of input/output ports 24 and 26 are stored within the multiplier array 28. The coefficient words are presented in parallel to the carry-save complex multipliers 51-54. The data words are serially shifted to the right, as viewed in FIG. 4, through parity checking circuit 46, which also includes 2's complement circuits 55 and suitable support hardware 56. The data words can be complemented, if required for the current mode of operation, by circuit 55 before being broadcast to the multiplier array 28.

Figure 5:
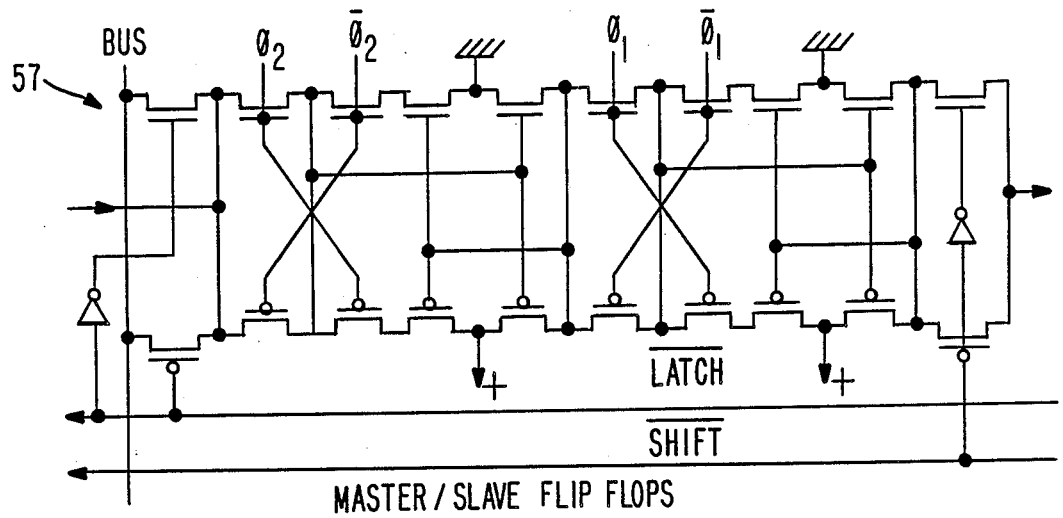
FIG. 5 is a schematic diagram of a master/slave flip-flop used in the multiplier array of FIG. 4.
Figure 6:
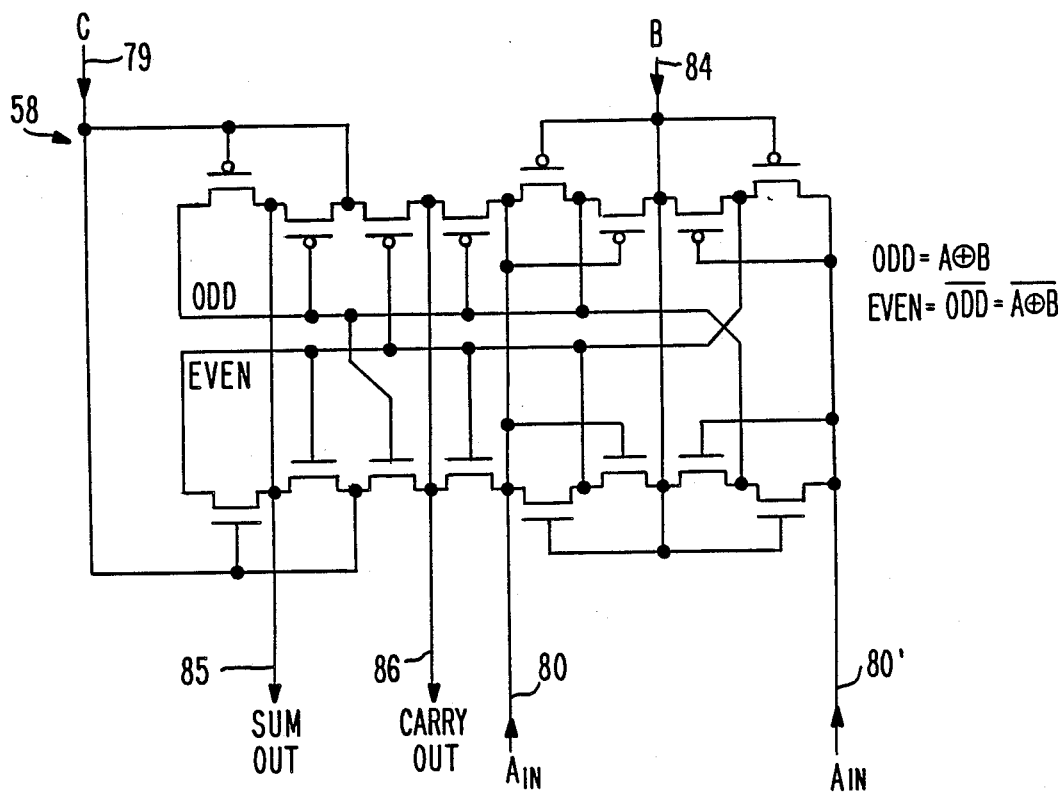
FIG. 6 is a schematic diagram of a full adder used in the multiplier array of FIG. 4.
Figure 5A:
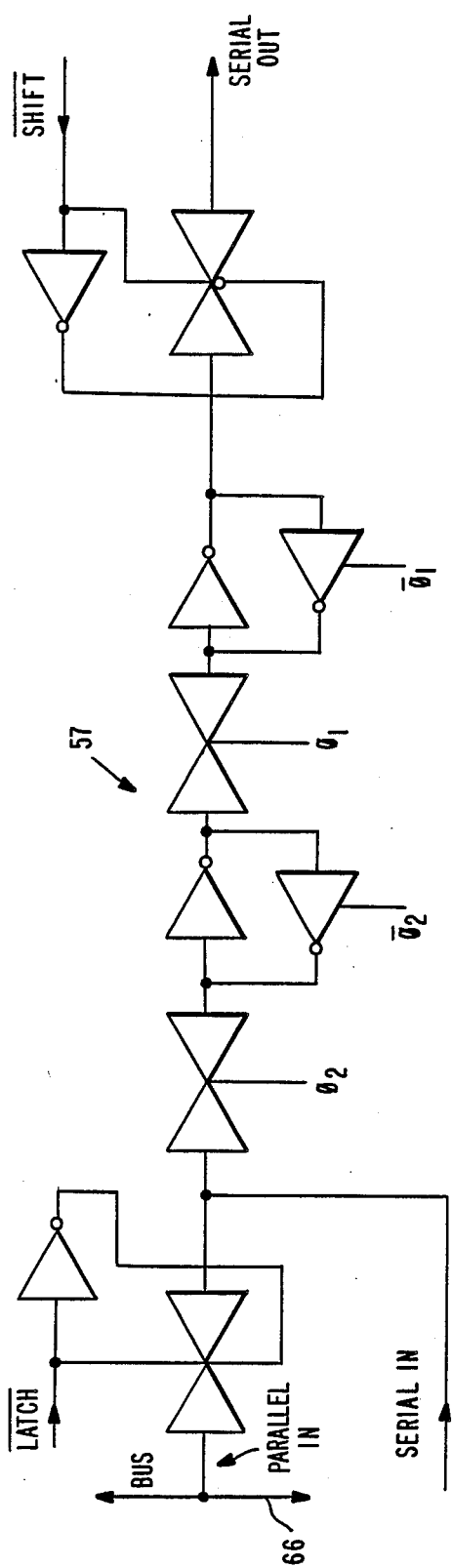
FIG. 5A is a logic diagram of the flip-flop circuit of FIG. 5.

The building blocks of the multipliers and most of the arithmetic logic are master-slave flip-flops (MSFF) 57 and full adders 58 such as those shown in FIGS. 5 and 5A, and 6, respectively. The MSFF device of FIGS. 5 and 5A allows the transistor drain and source regions to be shared, thereby producing a very small device. As shown by the logic diagram of FIG. 5A, when the latch signal is enabled, a bit of information can pass into the "master" portion of the flip-flop. This information is clocked into the flip-flop on one phase of the clock ($\phi_2$) and is inverted. The inverted signal is then fed to the "slave" portion of the flip-flop 57, and is clocked into that portion by the other phase of the clock ($\phi_1$). The information bit is then shifted out, via the "serial out" line, to the next adjacent cell when the shift line is enabled. This register has parallel input, serial input, and serial output capabilities.

The transmission gate full adder 58 in FIG. 6 requires only 16 devices and has no connections to power or ground. The transmission gate design style allows all drain and source regions within the adder to be shared between two devices. The result is a dense adder layout requiring approximately 4800 $\mu m^2$. Circuit simulations of the transmission gate adder indicate a worst case propagation delay of less than 7 ns. The full adder 58 performs the addition of 3 bits, represented by A, B, and C, and produces the Sum bit and the Carry bit. Logically, the outputs are described as follows:

$$\text{Sum} = (A \oplus B) \cap \overline{C} + (A \oplus \overline{B}) \cap C, \quad (5)$$

$$\text{Carry} = (A \oplus \overline{B}) \cap A + (A \oplus B) \cap C. \quad (6)$$

The exclusive-or (XOR = $\oplus$) function needed to generate the Sum bit is realized using a transmission gate approach since an attempt to realize an XOR with combinations of NOR and NAND gates will result in a slow and bulky realization. A pass transistor realization of XOR and XNOR (exclusive-nor) requires the fewest number of devices to establish the function. Thus the generation of the sum and carry outputs is as follows:

$$\text{ODD} = A \oplus B \quad (7)$$

$$\text{EVEN} = \overline{A \oplus B} = \overline{\text{ODD}} \quad (8)$$

Thus SUM and CARRY are:

$$\text{SUM} = \text{ODD} \oplus C \quad (9)$$

$$\text{CARRY} = \text{ODD } C + \text{EVEN } A \quad (10)$$

Figure 7:
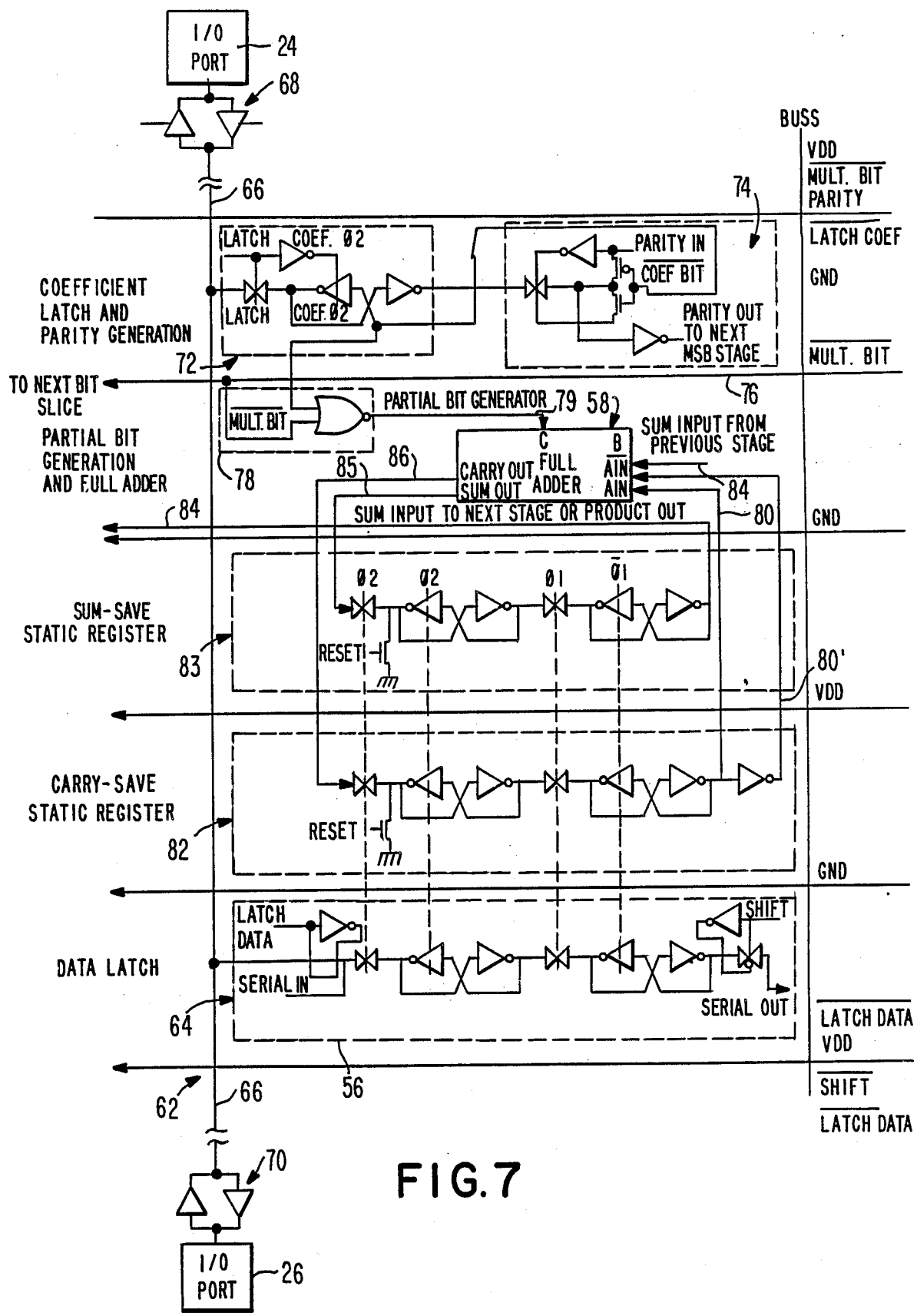
FIG. 7 is bit-slice core segment, four of which are used in each bit-slice for each of the complex multipliers shown in FIG. 4.

Due to the small area of the flip-flop and adder cells of FIGS. 5 and 6, the overall density of the multiplier array shown in FIGS. 2 and 4 can exceed 2800 devices per mm$^2$ in a 2 $\mu$m CMOS technology. Each of the complex multipliers 51-54 in FIG. 4 includes twenty bit-slices, indicated diagrammatically at 60 in the multiplier 51, with each bit-slice 60 functionally consisting of four identical bit-slice core segments 62, one of which is illustrated in FIG. 7, to which reference is now made.

Each bit-slice core segment 62 includes a data latch 64 which is a master/slave flip-flop, such as that shown schematically at 57 in FIG. 5, and in more detailed logic block diagram form in FIG. 5A. The data latch 64 receives data from bus 66 connected to input/output ports 24 and 26 through suitable selectable drivers 68 and 70, respectively. A coefficient latch 72 is also connected to bus 66 for receiving coefficients from input/output ports 24 and 26, and a parity check unit 74 provides parity checking of the coefficient latch 72 contents.

The heart of the multiplications process is carried out as follows. The data bits from the data word selected by the processor address generator are latched into the data latches 64 of the complex multiplier, and the entire word is bit-serially shifted rightward in the multiplier array 28 to the data parity check and 2's complement circuitry 46. There the parity of the bit-serially shifted data is checked and the data is bit-serially 2's complemented (negated) if so required, as determined by the processor operating mode. The resultant word from circuit 46 is broadcast one bit at a time along bus 760 to all the multiple bit-slices 60. In each of the bit-slice cores 62, the broadcast multiplier bit is logically ANDed with the stored coefficient bit (from latch 72) in the partial bit generator 78. The result of this is fed on line 79 into the the full adder 58 along with any carry bit from any previous addition, which is supplied by way of lines 80 and 80' from storage in carry-save static register 82 of the same bit-slice core segment. The sum bit from the previous addition which was stored in the sum-save static register 83 in the bit-slice core segment to the right of the current bit-slice core segment doing the current addition is also supplied to adder 58 by way of line 84. The bit by bit addition is performed and the new sum and carry bits are stored in the registers 83 and 82, respectively, by way of lines 85 and 86 for use by the next addition, with the result of the multiplication appearing on the sum line 84 of the last bit slice core segment.

Figure 8:
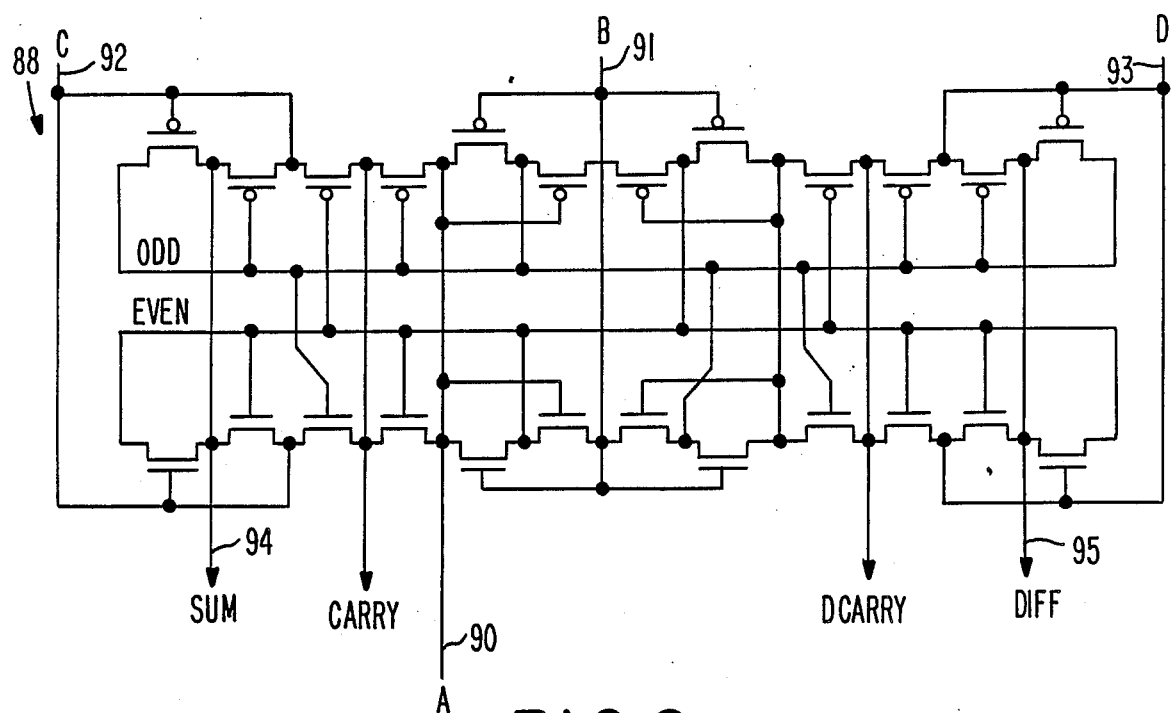
FIG. 8 is a sum/difference cell used in the add/subtractor matrix of FIGS. 2 and 4.

The sum/difference cell 88 shown in FIG. 8 is the foundation of the adder/subtractor matrix 36, receiving inputs on lines 90–93 from the core segments 62, and producing sum and difference results on lines 94 and 95, respectively. This circuitry performs a full add in a fashion very similar to the circuitry of FIG. 6, yielding a SUM and CARRY. It also performs a subtraction yielding a difference DIFF and DCARRY. The two operations are provided simultaneously in a very compact design, using transmission gates, and hence has no direct connection to power and ground. The interconnection of cells 88 is shown in FIG. 4. The rightmost column 96 of adders and subtractors is formed by corresponding halves of cells 88, which combine the results of the complex multiplications from the outputs 84 of the 16 multipliers in the complex multipliers 51–54, producing sum or difference signals on the respective lines 94 and 95 shown in FIG. 4. If the FFT add/subtract matrix in equation (3) is to be bypassed for a windowing or scaling operation, the results on lines 94 and 95 are taken directly to the shift registers 38 and 40 from this point by way of bypass bus 98 and the parity circuit 42. Otherwise, the FFT matrix operations are carried out in eight sum/difference cells 88 connected as shown in FIG. 4. Thus, the inputs of the four cells 88 in row 100 are connected to the outputs of the cells on row 96, while the outputs from row 100 are connected to the inputs of rows 102 and 104.

The parity generation and rounding circuits 42 are next to the adder/subtractor matrix 36 of the chip, and are connected to the outputs of the cells 88 in rows 102 and 104. The rounding logic 42 adds a 1 to the bit to the right of the least significant bit of the result just before it enters the result shift registers (RSRs) 38 and 40. The carry from the addition is added to the next bit of the result arriving at the rounding logic.

Result Shift Registers 38 and 40 are physically located on the processor chip 16 at the top and bottom of the arithmetic section to store the real and imaginary words of the results, respectively. They can shift either serially to the right, or in parallel towards the I/O ports 24, 26 by way of the bit input/output buses 66, to accomplish a serial-in/parallel-out conversion. The location of the sign extension bits of the outputs is detected at the inputs to the RSRs. This information is used by the scaling control 43 to detect the magnitude of the largest output of an FFT scan. This allows scaling to be adjusted in the next scan.

At the end of a multiplication scan, where the selected data words and coefficient words have been multiplied and the results stored in the RSRs for return to the external RAM, important status information pertaining to scaling and parity error status is shifted through the RSRs and placed on the data output bus 66 (FIG. 7). The real bus contains the block floating point exponent and the imaginary bus indicates which input registers, if any, experienced parity errors during the execution of the assignment.

Figure 9:
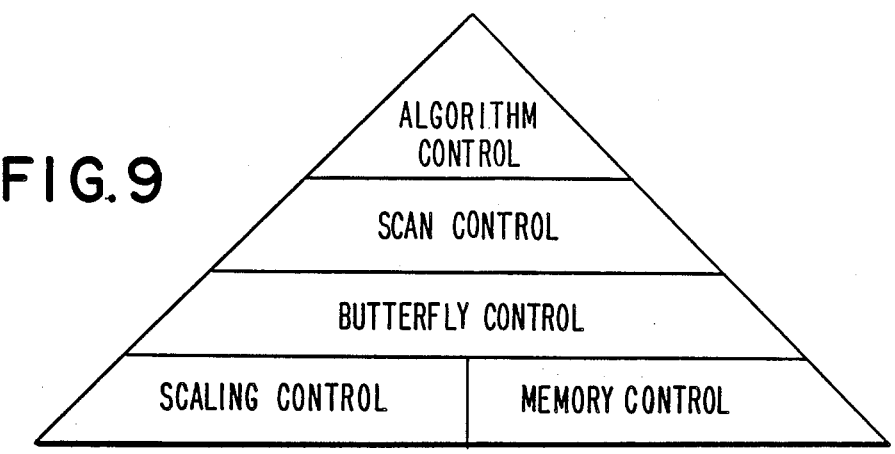
FIG. 9 is a diagram of the hierarchy of the functional controls carried out in the control circuits of the device of FIG. 2.

Referring back to FIG. 2, the control for the processor 16, located primarily in circuits 30, 32, 43, and 44, can be partitioned into five functional sections arranged hierarchically as shown in FIG. 9. These sections are memory control, scaling control, butterfly control, scan, and algorithm control.

The memory control function, carried out by the mode controller 44, the control sequencer 32, and the address generator 30, solves the problems of memory selection, address generation, and bus control to allow communication with external RAM and ROM without host intervention. To support its five possible modes of operation, the processor 16 must be able to address up to four separate memories: the data RAM 14, the FFT coefficient ROM 12, already discussed, a time window RAM or ROM similar to, or part of, the RAM 14 or ROM 12, and frequency domain multiplication RAM or ROM. Four memory select lines are provided in bus 22, originating at mode controller 44, and are selected in accordance with the desired current mode of operation.

Processor chip 16 provides on-chip generation of the RAM 14 and ROM 12 addresses by the address generation control circuit 30 as required to compute the assigned function. Other systems have required separate chips to perform the address generation function, or else they burden the host with the problem. In the present invention, this functional address generator block requires only 3 mm$^2$ of area and meets all addressing requirements, including altering the sequences for Inverse FFTs and handling FFT problem sizes such as 512, which are not a power of four.

The address generation control (AGC) 30 (FIG. 2) contains a butterfly counter which records the progress of the processor through the sequence of scans required to complete the processing. The address sequence generated by the AGC 30 is a function of the butterfly counter value stored in 30, the scan number, the FFT size selected by the user, and the current mode of operation, all of which are stored in mode control 44.

The three memory control outputs which are generated in the control bus 22 include: READ/WRITE, ADDRESS ENABLE, and READPULSE/WRITEPULSE. These lines can be used separately or in combinations to meet the control requirements of conventional RAM and ROM memory chips. All address bus lines and memory control lines to the processor 16 are placed in a high impedance state upon completion of an assignment to allow the host computer 10 to access the results in the data RAM 14.

Figure 10:
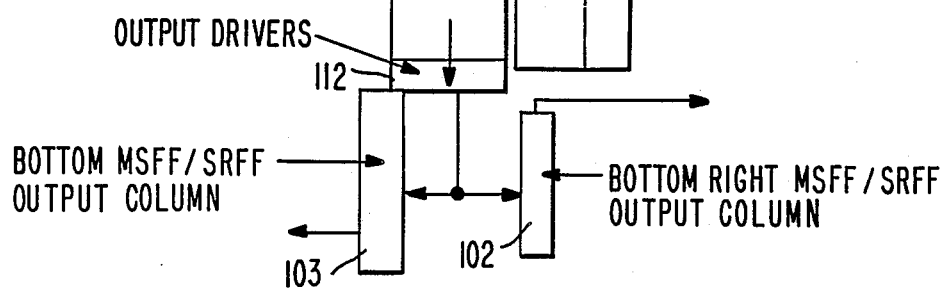
FIG. 10 is a more detailed block diagram of the control sequencer illustrated in FIG. 2.

The butterfly control logic, located primarily in the control sequencer 32, supervises the operations of the I/O ports, arithmetic logic, scaling, and memory control logic, to execute the radix-4 butterfly operation defined by equation (3). The block diagram of sequencer 32 is shown in FIG. 10.

The control sequence 32 is a large Programmable Logic Array (PLA) with a worst-case propagation delay of less than 15 ns, to accommodate a 50 MHz clock. The PLA consists of 18 inputs at the input drivers 110, 50 outputs at the output drivers 112, and 130 product terms generated by the AND plane 114 and fed into the OR plane 116, under the control of the ring counter 118. The speed and power dissipation of the array are significantly improved by replacing the resistive product term pullups with devices gated by the outputs of the ring counter. By limiting the regular AND plane inputs to slowly changing state variables, the ring counter technique eliminates the component of PLA propagation delay due to the delay driving AND plane input columns.

The details of a PLA (Programmable Logic Array) are well known in the professional literature. A PLA is a method of mapping irregular combinational Boolean functions into regular structures in silicon. The great advantages of this technique are:

(1) Functions may be significantly altered without making drastic alterations in the design or layout of the PLA structure.

(2) The array can be made programmable at the metalization or contact level, thus allowing for last minute design changes.

(3) A PLA matrix of any size can be assembled using a few basic cells which are replicated as is necessary. This type of approach is desirable for a VLSI implementation as it reduces the possibility of errors and shortens design time considerably.

All of the above have been made possible by the advent of large-scale-integration as a reliable technology for implementing digital systems. The PLA can be thought of as a ROM with the address port being programmable as well as the data. Hence, since only a few inputs (i.e., addresses on ROM terminology) are needed, the PLA does not provide every possible combination of minterms ($2^N$ for N input variables), but only provides for the desired ones, which usually makes it far more compact than a ROM.

Figure 11:
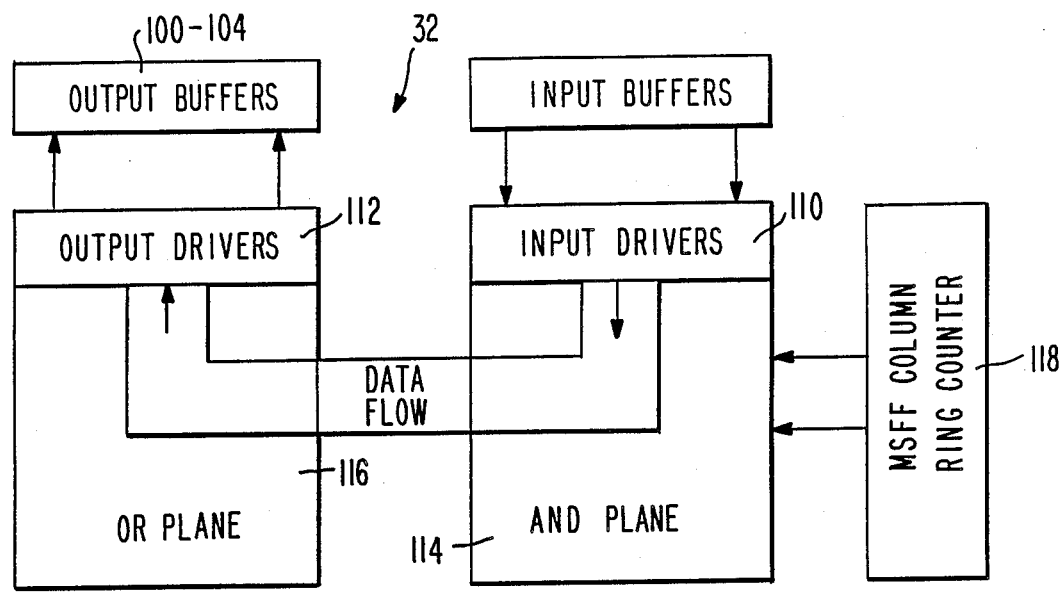
FIG. 11 is a block diagram of a programmed logic array, used in the device of FIG. 2.
Figure 12:
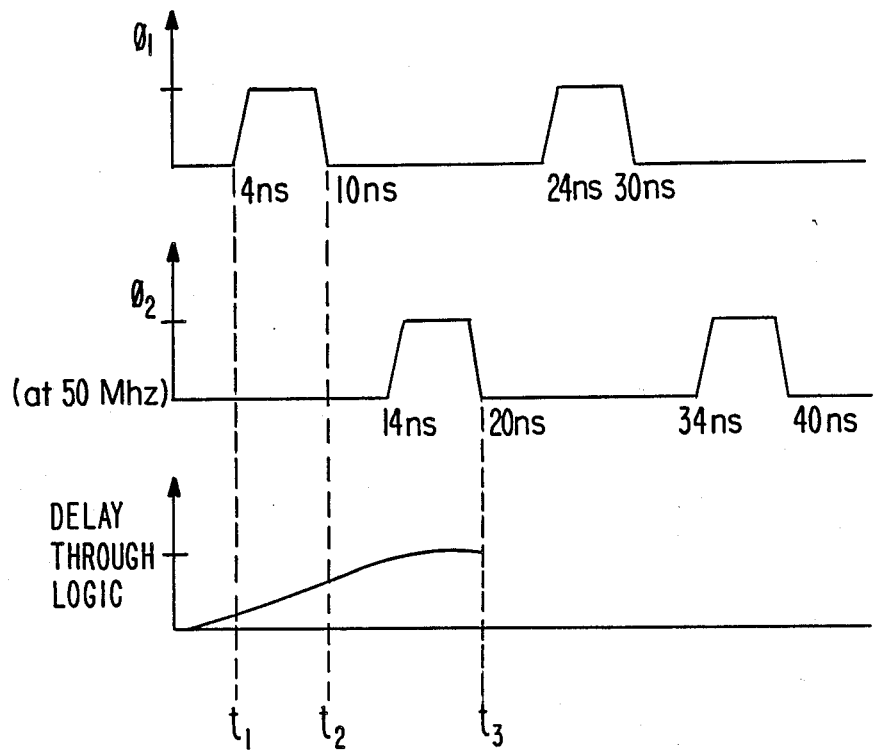
FIG. 12 is a two phase clocking diagram for the PLA of FIGS. 10 and 11.

FIG. 11 is a generalized illustration of PLA 32. It consists of input buffers 119, drivers 110, AND plane 114, OR plane 116, output drivers 112, and inverting output buffers 110–104. The PLA used in the present chip is similar to a standard PLA, but differs in the use of a master/slave flip-flop (MSFF) as a ring counter 118. The stages of the MSFF column are connected to corresponding stages of the AND plane, so that as a logic "1" is propagated down column 118, the corresponding stages of the AND plane are activated. Thus, the presence of a "1" activates only those product terms in the AND plane which should be enabled for the current state of the PLA. The PLA 32 assumes a two-phase nonoverlapping clocking scheme: $\phi_1$ and $\phi_2$. The inputs to the PLA must be stable during $\phi_1$ and the outputs must be stable by the end of $\phi_2$, so that the true values of the expression may be latched into the output registers. The inputs stored in the registers are fed vertically to the AND plane during $\phi_1$. Using both true and inverted senses of the inputs, they are AND'ed into specifically programmed combinations which are then fed horizontally as inputs to the OR plane; there, once again, they are OR'ed in programmed combinations. The outputs are inverted to form a sum of products Boolean expression and stored into latches by the end of $\phi_2$. The two phase clocking is shown in FIG. 12.

Figure 13:
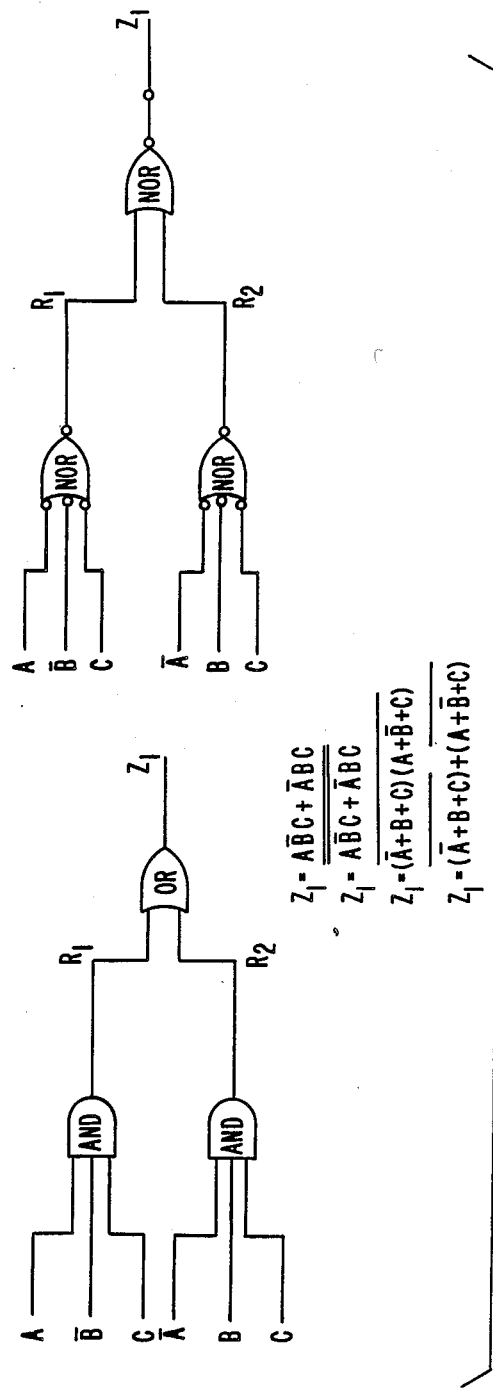
FIG. 13 is an example of one sum-of-products logic implementation using the AND/OR planes of the PLA of FIG. 12.

To clarify the structure and function of the AND-/OR planes 114 and 116 in a PLA, consider the logic expressions and the equivalent realizations in FIG. 13. It is evident from FIG. 13 that an AND-OR is equivalent to a NOR-NOR with inverted inputs and outputs. Since it is convenient to realize the NOR function, the above relationship is used to generate the AND-OR function via the NOR-NOR function. Thus both AND-OR planes are identical at the circuit level, although they perform separate logic functions.

Figure 14:
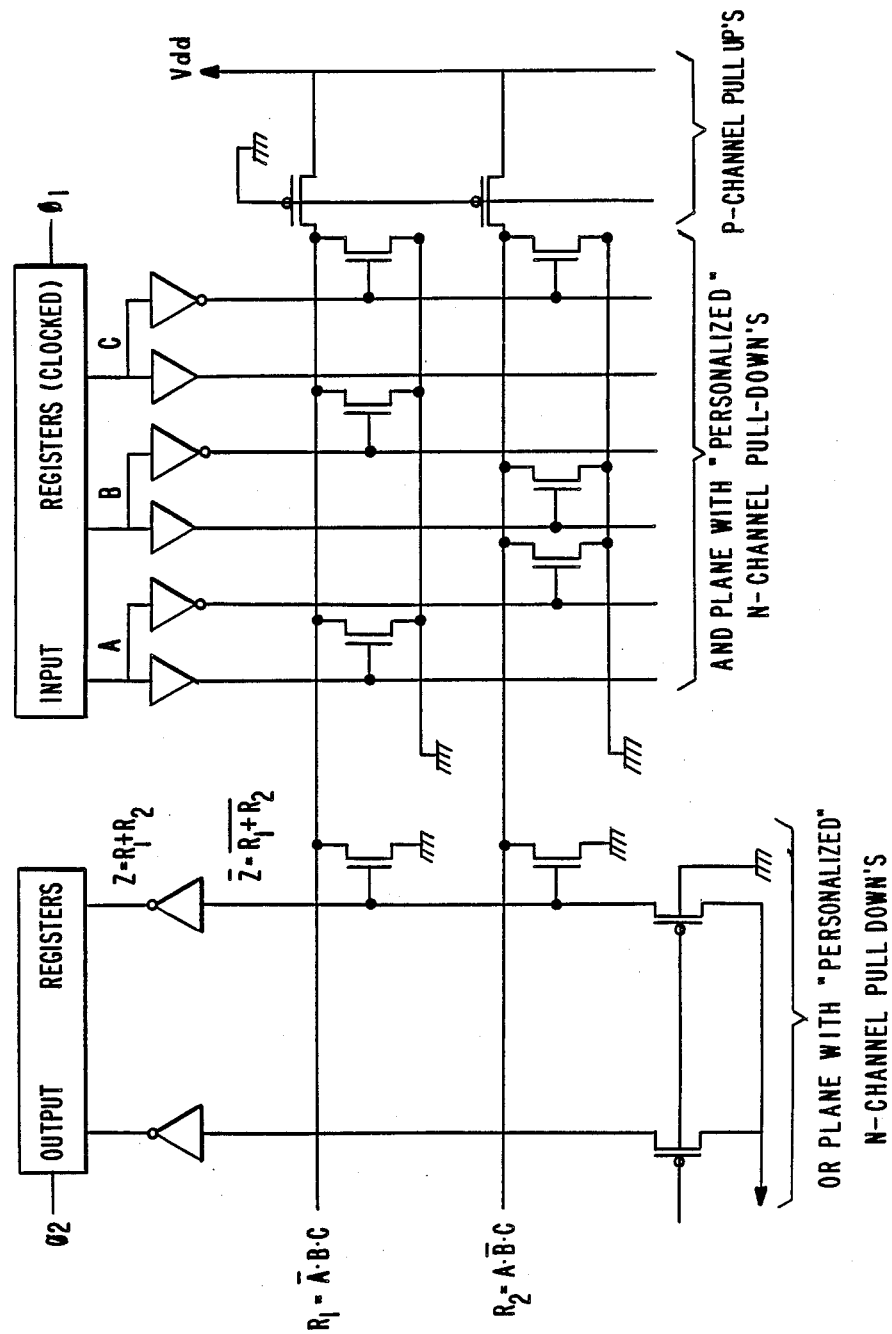
FIG. 14 is an example of part of the schematic for a programmable logic array.

Consider FIG. 14, which is a transistor schematic of a PLA. The complementary nature of CMOS is not the best choice for the PLA structure in terms of area usage since the device count would be double that of an NMOS implementation. Thus the NOR function is realized using P-channel load transistors with grounded gates and N-channel drivers as inputs. This means that static power is dissipated because the P-channel devices are conducting current at all times. P-channel loads are used since they can pull up the outputs all the way to Vdd. But, since this is an NMOS type of circuit, it is necessary to ratio the P-channel and N-channel device widths in proportion to the mobilities of holes and electrons respectively.

The AND plane outputs $R_k$ are the logical AND of the input variables which are connected to the pull-downs. For example, some R values could be given by:

$$R_1 = A.\bar{B}.C$$

$$R_2 = \bar{A}.B.C.$$

The R's now act as inputs to the NOR (OR) plane. The output Z, after inversion, is the realization of the programmed expression:

$$Z_1 = R_1 + R_2 = A.\bar{B}.C + \bar{A}.B.C$$

Therefore, each horizontal line on the PLA carries one product term generated from the AND plane, and all of these horizontal lines are fed into the OR plane, whereby each vertical line in the OR plane generates a sum of products canonical Boolean expression.

Since the processor chip 16 can operate in a variety of modes and since its signals are dependent on the scale factor of the previous operation, the PLA sequencer 32 accepts inputs from both the mode control 44 and the scaling control 43 (See FIG. 2). Each set of unique inputs defines a state variable of the processor chip 16. Outputs are generated at drivers 112 accordingly, and buffered by a set of flip-flop latches 100–104 before being fed to their destinations. One clock cycle is needed to generate the outputs from the PLA and these outputs are broadcast in the next clock cycle. This pipelined approach allows the sequencer to operate at the same frequency as the multipliers.

The PLA control sequencer 32 operates as a sequential finitestate machine without feedback. The hardware is dedicated to performing one radix-4 butterfly every 52 machine cycles until all the data has been completely scanned. Since the algorithm is completely sequential, there is no need to provide for hardware branches in the design. A special case such as this can be exploited to provide for faster operation.

A bank of 52 sequentially connected flipflops with a '1' propagating through it, comprises the ring counter 118, and is the novel feature which controls the 52-state PLA. The position of the '1' in the ring counter corresponds to the current state and enables a particular set of product term pull-ups. Thus only those product terms associated with the current state will be enabled. All other product terms will be disabled completely.

The scan and algorithm control circuits residing mainly in the mode controller 44 and the control sequencer 32 perform the high level control functions required to sequence the radix-4 butterfly unit through the programmed modes of operation. Table 1 defines the 15 bit programming word which is loaded through the address bus and stored in the mode controller 44 shown in FIG. 2.

TABLE 1

| PIN # | ADDR BIT | PROGRAMMABLE BIT | PIN # | ADDR BIT | PROGRAMMABLE BIT |
|---|---|---|---|---|---|
| \_\_\_\_ | \_\_\_\_ | ASSIGNMENT OF PROGRAMMING BITS TO ADDRESS PORT | \_\_\_\_ | \_\_\_\_ | \_\_\_\_ |
| 121 | $A_1$ | FFTSIZE > 4 | 4 | $A_8$ | Do Scale Mode |
| 123 | $A_2$ | FFTSIZE > 16 | 5 | $A_9$ | Do IFFT Mode |
| 124 | $A_3$ | FFTSIZE > 64 | 6 | $A_{10}$ | Do MULT Mode |
| 125 | $A_4$ | FFTSIZE > 256 | 8 | $A_{11}$ | Do FFT Mode |
| 126 | $A_5$ | FFTSIZE > 1024 | 11 | $A_{12}$ | Do Window Mode |
| 2 | $A_6$ | FFTSIZE > 4096 | 13 | $A_{13}$ | Do Correlation |
| 3 | $A_7$ | POWER_OF_4 | 14 | $A_{14}$ | Watchdog |
|  |  |  | 16 | M2 | Parity in Use |

The processor chip 16 moves between scans in an FFT or IFFT without any performance penalty. There is an eight clock cycle delay between modes of operation to reset the arithmetic and control circuitry within the processor. Total overhead is insignificant except for very small problem sizes.

This invention contains just over 62,000 devices in a 300×300 mils² area when fabricated with a conventional two level metal 2 μm bulk CMOS process, and is designed to operate on a 50 MHz two-phase clock, giving it a functional throughput of $1.3 \times 10^{12}$ gatexHz/cm².

There are 84 functional I/O and power pins required for the processor chip 16. Forty additional test outputs are provided to improve testability. Three power and three ground pads are provided for the I/O circuitry. In addition, two power and two ground pads supply power to the internal circuitry.

Three pads are allocated for each clock phase to allow 50 MHz clock signals to be propagated through the chip with minimal clock skew. Clock signals are brought directly onto the chip without buffering at the pads. The two-level metal process allows low resistance to be achieved in both the power and clock distribution lines.

Table 2 lists the performance of chip 16 for some typical applications. The invention computes a radix-4 butterfly every 1.03 μs, or 15.4 million 20+20 bit multiplications per second. By making extensive use of the inverter/transmission gate static CMOS design style, a density of 1033 devices/mm² is achieved for the entire processor chip. Static storage and logic techniques were used instead of more compact dynamic logic implementations to provide more reliable operation in radiation and high leakage environments.

TABLE 2

PROCESSOR CHIP PERFORMANCE BENCHMARKS

|  | EXECUTION TIME | MAXIMUM DATA RATE |
|---|---|---|
| Radix-4 Butterfly (complex data) | 1.04 μs | 3.8 MHz |
| 1024 Point FFT (complex data) | 1.33 ms | 770 KHz |
| 512 Tap FIR Filter | 3.2 ms | 310 KHz |
| Effective 20 × 20 bit Multiply | 65 ns | 15.4 MHz |
| 256 Point Hamming Window (real data) | 32 μs | 7.7 MHz |

Figure 15:
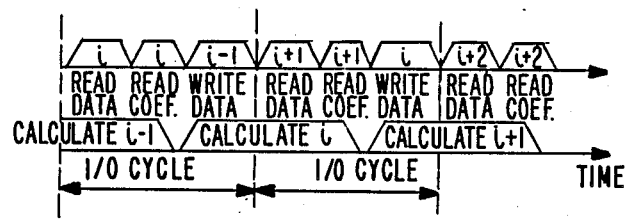
FIG. 15 is a diagrammatic illustration of the generalized pipelined timing diagram for the input/output of data, coefficients, and calculations into and out of the processor chip of the present invention.

The pipelining of input/output operations and arithmetic operations is shown in FIG. 15, wherein each input/output cycle is shown to include a "read data", a "read coefficient" and a "write data" sequence. These sequences overlap the calculations which proceed simultaneously in the arithmetic sections of the processor chip 16 and the temporary storage of the results in registers 38 and 40 which allows for faster operation of the system.

The bit-serial circuits used in the present invention provide many advantages. The smaller size of bit-serial multipliers permits the use of 16 multipliers on a single chip, and provides the equivalent throughput of one 65 ns 20×20 bit-parallel multiplier in continuous operation. A disadvantage of the bit-parallel architecture is that several scratch-pad registers would be required to pipeline the arithmetic section effectively, and parallel busses would be needed to bring results to and from registers and arithmetic units. The control of the communications is elaborate using the parallel approach and the energy and time to distribute operands is also considerable in such devices.

In the present invention, all data transfers are along dedicated paths. These communications are local, regular and simple. Parallel busses are absent, except for one bus to bring operands to their respective input registers. This results in a better use of the processor chip area. The local communications allow much higher clock rates and less power dissipation.

Special hardware for rounding and 2's-complementing, parity checking and generation is expensive in a bit-parallel systems. With bit-serial hardware all this is much simpler. The processor chip 16 can do all arithmetic in double-precision with only one rounding for every output word. Further, because of the simple control of the arithmetic section, all control signals can be generated on-chip in the fast PLA controller 32.

The bit-serial architecture allows construction of the arithmetic section by merging a small number of predesigned cells. Interconnections between cells are established by placement of the cells; there is no need for extra routing of wires.

To summarize, 16 multiplications, 24 additions or subtractions, 16 parity checks, 8 roundings and 8 parity generations are pipelined between input and output registers with only four dynamic control signals, allowing simple, fast control. In contrast to this, in a bit-parallel machine a microprogram or complicated hardwired pipeline would be required.

The noise caused by coefficient rounding is negligible compared to the rounding noise. If 16 bit coefficients are used, a coefficient noise with an average power about 90 dB below the power of the input signal is introduced for an FFT of length 16384 points followed by an inverse FFT. Using 20 bits for the coefficients the coefficient noise will be at −114 dB.

Much more important is the noise caused by the adjustment of the multiplications results from double-precision to single-precision. This noise depends largely on the adjustment method used, on when the adjustment is done during the algorithm, and on the actual data input. A benchmark input is a white noise with no DC component, flat distribution and 16 bits of precision at the input.

If the chip 16 performs a 1024-point FFT on this benchmark input followed by an inverse FFT, then the original sequence is reconstructed with an added noise. This noise has a power 88 dB below the power of the original input.

If the processor chip 16 used truncation instead of rounding, th esignal to noise ratio would degrade by 8 dB.

The extra 4 guard bits help to improve the numerical performance (an extra 12 dB on average) over the best achievable performance by a 16 bit block-floating-point system.

Since the FFT computation is a bottleneck in many signal processing systems, most notably radar processing, it is desirable to obtain the highest possible performance per processor. Due to the bit-serial architecture and high speed control logic of the chip 16, a 1024 point FFT on complex data is expected to need 1.4 ms.

The simple host interface required by processor chip 16 allows it to be easily integrated into a variety of system architectures. For many FFT applications the performance of a single processor will suffice. In these cases, the processor can be operated as a peripheral to its microprocessor host. FIG. 1 depicts this simple system configuration.

Figure 16:
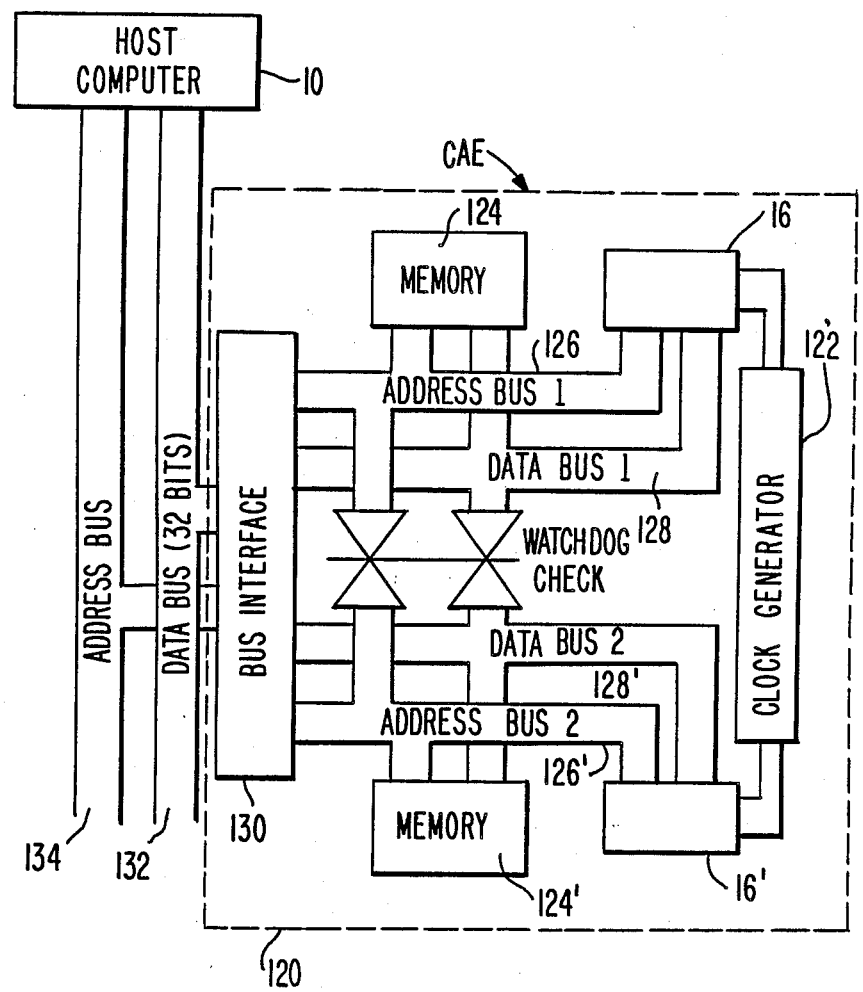
FIG. 16 is a diagrammatic illustration of a two-processor array element which includes an "active" processor and its fault-detecting "watchdog" processor.

To meet the high performance requirements often encountered in radar and sonar applications, many of these processor chips can be efficiently combined into large, fault-tolerant multiprocessor arrays. One possible chip array element (CAE) is shown at 120 in FIG. 16. Two processor chips 16 and 16' in the array element 120 operate either independently or as an active/watchdog pair at the discretion of the host computer 10. This allows the host 10 to determine the frequency of watchdog checks. The array element 120 can be built on a hybrid circuit containing a local common clock generator 122.

Processor chip 16 may be selected as the active processor and is connected to memory unit 124 by address and data busses 126 and 128, respectively. Similarly, processor chip 16' may be selected as the fault-detecting watchdog processor and is connected to memory unit 124' by address and data busses 126' and 128', respectively. Both sets of busses connect with bus interface unit 130 which, in turn, connects the array element 120 with the system data bus 132 and the system address bus 134. In such an array element, if the results produced by the processors 16 and 16' do not agree, then an error has occurred on one of the processor chips. The existence of a faulty array element can be determined by the host computer 10, and the element can be disconnected from an array system.

Figure 17:
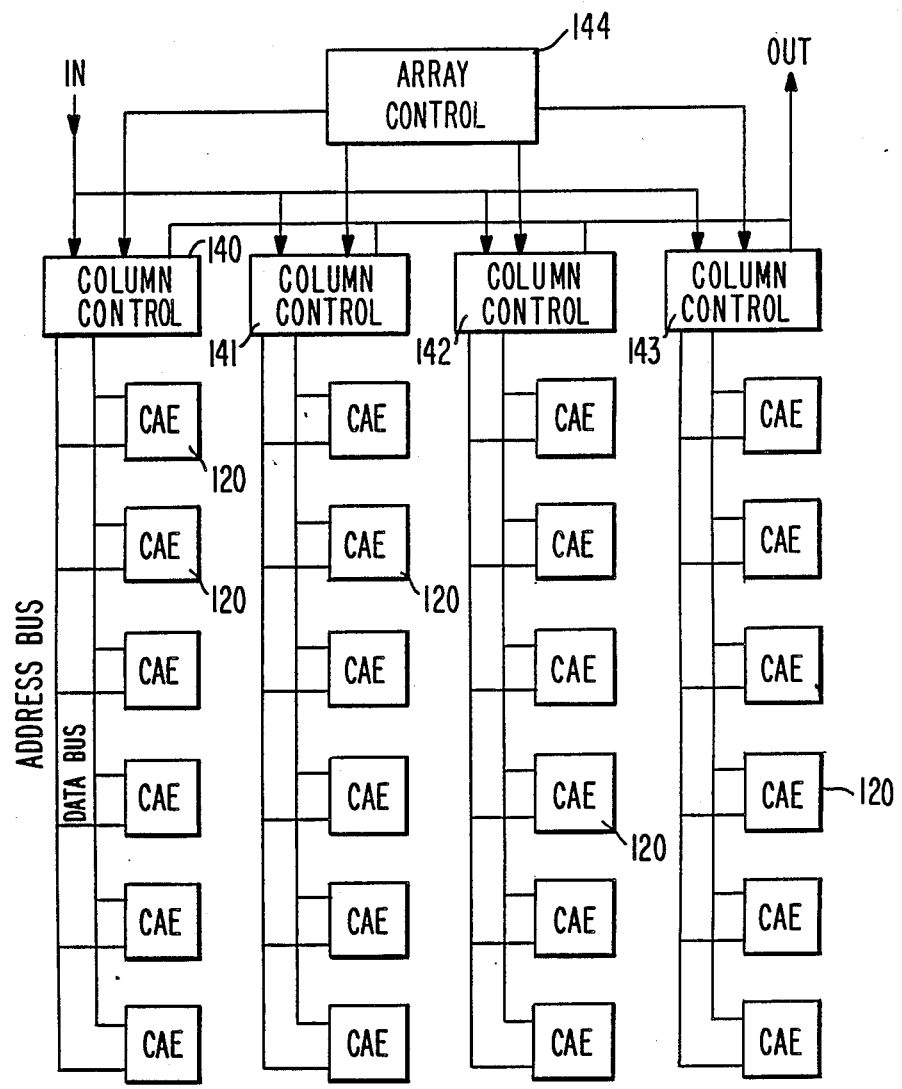
FIG. 17 is a diagrammatic illustration of an array system using a multiplicity of the array elements of FIG. 16.

As illustrated in FIG. 17, a number of Chip Array Elements 120 can be grouped into columns under the supervision of column controllers 140-143, and an array controller 144 which may be part of a host computer. Multiple columns form a two dimensional array of processor elements which meet high performance and fault-tolerance requirements. FIG. 17 shows a 6×4 array of CAEs. This array has a maximum computational capability of approximately 740 million multiplications per second.

Spare array elements can be added to each column to replace CAEs which fail in the field. Fault diagnostics can be run by computing the same FFT in two CAEs and comparing final results. This provides four opinions from which the faulty processor chip can be identified.

Column controllers 140-143 monitor and control the health of the array elements by performing fault detection, isolation, and reconfiguration. These tasks operate from the parity and watchdog error status information provided to the controllers at the completion of each assignment.

Spare columns can also be included in arrays similar to FIG. 17 to guard against the possibility of a column controller failure. The distribution of problems to the individual columns can be easily changed by the array controller 144 to reflect the number of functional elements in each column.

Array elements 120 provide a natural mechanism for implementing the degree of fault-tolerance desired by the user. The arrays also allow graceful degradation of system performance in the presence of faults. In this regard the array approach offers significant advantages over pipelined and systolic array architectures for computing the FFT and related algorithms. These systems can often tolerate a few faults but fail completely if that number is exceeded.

Thus, there has been described an improved signal processor chip and array for executing processing functions with greater speed and precision than has previously been available. The processor chip 16 is completely autonomous, and is implemented as a single, monolithic chip with a simple control interface which allows it to be used in a broad range of applications from peripherals for microprocessors to ultra-high performance, fault-tolerant arrays. Although the invention has been described in terms of preferred embodiments, it will be understood that variations and modifications may be made without departing from the true spirit and scope thereof, as defined in the following claims.

What is claimed is:

1. A monolithic, autonomous processor chip for selected data processing, said chip including:
   an array of at least 16 bit-serial multipliers;
   a plurality of input/output ports for supplying selected complex data and complex coefficients to said multipliers for multiplication;
   means for receiving and latching complex data and coefficients supplied to said multipliers and for parity checking of the data and coefficients;
   a bit-serial adder/substractor matrix connected to said multiplier array for combining the multiplier output data results;
   shift register means receiving and temporarily storing signals from said adder/subtractor matrix and for serial to parallel conversion of stored signals for delivery of said stored signals to input/output ports;
   scaling control means for scaling said signals from said adder/subtractor matrix before storage in said shift register means;
   sequencer control means having control outputs connected to said multiplier array, to said adder/subtractor matrix, to said shift register means, and to said scaling control means for controlling internal step-by-step operations of said chip;
   mode controller means connected to said sequencer control means for controlling and selecting the operational modes of said chip and for activating said sequencer control means to provide repetitive sequencing of selected operations, said mode controller being connectable for communication with a host processor; and address generator means on said chip and connected to said sequencer control means and to said mode control means for selecting complex data and complex coefficients for multiplication in said multipliers.

2. The processor chip of claim 1, wherein said plurality of input/output ports are bit-parallel ports.

3. The processor chip of claim 2, wherein said bit-serial multiplier array and said bit-serial adder/subtractor matrix cooperate to compute a radix-4 butterfly.

4. The processor chip of claim 1, further including external memory means connected to said input/output ports for supplying data and coefficients to said processor chip and for receiving processed signals.

5. The processor chip of claim 1, wherein each of said bit serial multipliers includes a plurality of bit cells, each bit cell including at least one full adder unit and at least one master/slave flip-flop shift register.

6. An array of processor chips interconnected to provide independent simultaneous operation for multiprocessing, comprising:

at least first and second processor chips each including a plurality of input/output ports, each processor chip including an arithmetic section for processing data in accordance with a predetermined algorithm;

memory means connected to said array for storage of data to be processed, said input/output ports being connected in parallel with said memory means;

control means including address generator means on each of said processor chips for selecting data from said memory means for supply to the arithmetic section of the corresponding processor chip by way of said input/output ports, for processing said selected data, and for subsequent return of processed data to said memory means; and at least one of said chips being a redundant chip operating in parallel with another chip to provide a check on the processed data produced by at least one other of said chips.

7. A high performance, monolithic, autonomous signal processor chip for computing digital signal processing algorithms based on the Fast Fourier Transform, comprising:

a multiplier array of bit-serial complex multipliers for carrying out four simultaneous bit-serial complex multiplications of four complex data words with four complex coefficients words, each multiplier including 20 bit slices to accommodate words up to 20 bits in length;

an adder/subtractor matrix connected to said multiplier array to receive and combine output data from said bit serial complex multiplier array to produce high-precision serial result signals;

result shift register means connected to said adder/substractor matrix for temporarily storing said result signals;

input/output means connected to said multiplier array for supplying said selected data and coefficient words to said chip and connected to said result shift register means for transferring said result signals out of said chip;

an address generation logic circuit for selecting from an external memory said data and coefficient words for multiplication by said multiplier array;

a control sequencer connected to said multiplier array and to said address generation control logic for operating said multiplier array to perform said complex operations and to control all internal step-by-step operations needed for said chip to process data; and a mode controller connected to said control sequencer and to said address generation control logic circuit for selective operation of said chip, said mode controller being connectable to a chip external host computer, said mode controller activating said control sequencer to initiate a selected sequence of operations.

8. The signal processor chip of claim 7, wherein said input/output means are connected to external RAM and ROM memories for storing said data words and said coefficient words, respectively, said external RAM memory further storing result signals transferred out of said processor chip.

9. The signal processor chip of claim 8, wherein said input/output means include parallel input/output ports on said processor chip, said input/output ports being connected to said external RAM and ROM memories through address, data, and control buses.

10. The signal processor chip of claim 9, wherein said input/output means on said processor chip are further connected to said address generation control logic circuit, whereby data and coefficient words are selected from said RAM and ROM memories.

11. The signal processor chip of claim 10, wherein said input/output means on said processor chip are further connected to said mode controller on said processor chip, said mode controller being selectively programmed fro a desired mode of operation, said mode controller further including a control sequencer initializing circuit and a ring counter, said control sequencer initializing circuit activating said ring counter.

12. The signal processor chip of claim 11, further including rounding circuitry connected to said adder/subtractor matrix, for bit-serial rounding of said result signals in said result shift register means.

13. The signal processor chip of claim 12, further including parity check circuitry connected to said multiplier array.

14. The signal processor chip of claim 13, further including scaling circuitry connected between said adder/subtractor matrix and said result shift register means for scaling and parity generation on said result signals.

15. The signal processor chip of claim 14, wherein said multiplier array, address generation circuit, mode controller, control sequencer initializer, control sequencer, adder/subtractor matrix, result shift register means, scaling, rounding and parity means, and input/output means are positioned on a single chip and closely spaced to permit extremely short interconnections to produce a high-speed processor chip of extremely small dimensions.

16. The signal processor chip of claim 10, wherein said result shift register means includes a first set of result shift registers for temporary storage of real result signals and a second set of result shift registers for temporary storage of imaginary results, said real and imaginary result signals being produced by the bit-serial addition/subtraction in said adder/subtractor matrix of the bit-serial complex multiplication from said multiplier array.

17. The signal processor chip of claim 7, wherein said mutliplier array comprises four, bit-serial complex multipliers, each having 20 bit slices, each bit slice including four bit slice core segments and each core segment incorporating a data latch for receiving a corresponding data bit, a coefficient latch for receiving a corresponding coefficient bit, a multiplier stage having a full adder, a sum-save static register, and a carry-save static register, data word bits from said data latch and complex coefficient bits from said coefficient latch being connected to said multiplier stage for multiplication, the output signal from said multiplier stage being connected to said carry-save register and through said sum-save register to a core segment output line.

18. The signal processor chip of claim 17, wherein said data latch includes a master/slave flip-flop circuit.

19. The signal processor chip of claim 7, wherein said adder/subtractor matrix comprises a plurality of sum and difference networks connected to said complex multiplier circuits.

20. The signal processor chip of claim 7, wherein said control sequencer includes a counter means for controlling the sequence of operation of said multiplier array.

21. The signal processor chip of claim 7, wherein said input/output means are connected to external data, address, and control buses for connecting said chip to external RAM and ROM memories for storage of data words and coefficient words to be multiplied in said multiplier array, and for storage of said result signals, said external buses being adapted for connection to a host computer for supplying data words in said RAM memory.

22. The signal processor chip of claim 21, wherein said input/output means is further connected to said mode controller for communication between said mode controller and a host computer by way of said buses.

23. A processor chip array element, comprising:
first and second high-performance, monolithic, autonomous signal processor chips for computing digital signal processing algorithms based on the Fast Fourier Transform, each of said processor chips including a multiplier array of bit-serial complex multipliers, an address generation control logic circuit for selecting data and coefficient words for multiplication by said multiplier array, a control sequencer for operating said multiplier array to perform complex multiplication, an adder/subtractor matrix connected to said multiplier to receive and combine outputs data from said bit-serial complex multiplier array to produce serial result signals, result shift register means for temporarily storing said result signals, input/output ports connected to said multiplier array and to said result shift register means, and a mode controller for selective operation and control interfacing with a chip external host computer via said input/output ports;
clock generator means connected to synchronously drive said first and second processor chips;
first and second memory means for said first and second processor chips, respectively;
first address data bus means connecting the input/output ports of said first processor chip to said first memory means for storing first result signals from said first processor chip;
second address and data bus means connecting the input/output ports of said second processor chip to said second memory means for storing second result signals from said second processor chip; and
means connected to said first and second processors for comparing said first and second processor result signals, whereby one of said first and second processor chips serves as an active processor, and the other serves to check the accuracy of the active processor.

24. The processor chip array element of claim 23, further including interface means for connecting said first and said second address and data bus means, whereby said chip array element can be connected in parallel with additional, similar chip array elements, whereby multiple signal processing can be carried on simultaneously in corresponding multiple chip array elements.

* * * * *

UNITED STATES PATENT AND TRADEMARK OFFICE
CERTIFICATE OF CORRECTION

PATENT NO. : 4,791,590
DATED : December 13, 1988
INVENTOR(S) : Walter H. Ku et al It is certified that error appears in the above-identified patent and that said Letters Patent is hereby corrected as shown below:

On the title page Insert

Related U.S. Application Data:

--(63) Continuation-in-part of Serial No. 659,482, filed October 10, 1984, now abandoned--.

Signed and Sealed this

First Day of August, 1989

Attest:

DONALD J. QUIGG

Attesting Officer

Commissioner of Patents and Trademarks